(12) United States Patent
Jennessen et al.

(10) Patent No.: US 12,158,745 B2
(45) Date of Patent: Dec. 3, 2024

(54) METHOD AND APPARATUS FOR CYCLE-BASED PROGRAMMING OF A CONTROL PROGRAM FOR A NUMERICALLY CONTROLLED MACHINE TOOL

(71) Applicants: Siemens AG, Munich (DE); DMG MORI Digital GmbH, Bielefeld (DE)

(72) Inventors: Johannes Jennessen, Schwalmtal (DE); Stefan Peschke, Dormagen (DE); Rudolf Hahn, Schwangau (DE); Jürgen Olomski, Tuchenbach (DE)

(73) Assignees: Siemens AG, Munich (DE); DMG MORI Digital GmbH, Bielefeld (DE)

( * ) Notice: Subject to any disclaimer, the term of this patent is extended or adjusted under 35 U.S.C. 154(b) by 411 days.

(21) Appl. No.: 17/429,524

(22) PCT Filed: Feb. 19, 2019

(86) PCT No.: PCT/EP2019/054128
§ 371 (c)(1),
(2) Date: Aug. 9, 2021

(87) PCT Pub. No.: WO2020/169186
PCT Pub. Date: Aug. 27, 2020

(65) Prior Publication Data
US 2022/0107626 A1    Apr. 7, 2022

(51) Int. Cl.
G05B 19/4155    (2006.01)
(52) U.S. Cl.
CPC ............ *G05B 19/4155* (2013.01); *G05B 2219/31016* (2013.01)
(58) Field of Classification Search
CPC ............... G05B 19/4155; G05B 2219/31016
(Continued)

(56) References Cited

U.S. PATENT DOCUMENTS 7,016,745 B1    3/2006  Dickerson et al.
2003/0171841 A1  9/2003  Porter et al.
(Continued)

FOREIGN PATENT DOCUMENTS

KR    10-2016-0053217 A    5/2016
WO    WO 2018083512 A1    5/2018
WO    WO 2018232234 A1    12/2018

OTHER PUBLICATIONS

International Search Report dated Nov. 18, 2019 for PCT App. Ser. No. PCT/EP2019/054128.
(Continued)

*Primary Examiner* — Jigneshkumar C Patel
(74) *Attorney, Agent, or Firm* — Henricks Slavin LLP

(57) ABSTRACT

The present disclosure relates to a method and apparatus for cycle-based programming of a control program for a numerically controlled machine tool at a control apparatus of the machine tool. Geometrical features, which have been detected and/or identified within a data analysis processing performed on the basis of workpiece data including a 3D workpiece model, each detected and/or identified geometrical feature being associated with a respective predetermined machining operation, are associated with a respective machine control cycle which is associated with a respective predetermined machining operation with which the respective associated geometry feature is producible. Further, one or more user-selectable options for cycle-based programming of the control program for the machine tool are provided by a graphical user interface on a display of a control panel of a control apparatus of the machine tool, each user-selectable option enabling a user to select a respective one of the machine control cycles being respectively associated with a respective one of the detected and/or identified geometrical features.

12 Claims, 5 Drawing Sheets

(58) Field of Classification Search
USPC .......................................................... 700/28
See application file for complete search history.

(56) References Cited

U.S. PATENT DOCUMENTS

| | | | | |
|---|---|---|---|---|
| 2004/0051720 | A1* | 3/2004 | Hall | G05B 19/40935 |
| | | | | 345/689 |
| 2004/0143362 | A1 | 7/2004 | Matthews et al. | |
| 2008/0201002 | A1* | 8/2008 | Crew | G06F 30/15 |
| | | | | 700/98 |
| 2011/0130854 | A1* | 6/2011 | Lettenbauer | G06T 17/30 |
| | | | | 700/98 |
| 2016/0054724 | A1* | 2/2016 | Oda | G05B 19/4069 |
| | | | | 356/600 |
| 2018/0259935 | A1* | 9/2018 | Saitou | G05B 19/182 |

OTHER PUBLICATIONS

Office Action dated Nov. 7, 2023 for EPO App. Ser. No. 19706578.2.

Y Poornachandra Sekhar et al., *A cloud based architecture for Automatic Feature Recognition in Distributed manufacturing environment*, Proceedings of the International Conference on Industrial Engineering and Operations Management, Bandung, Indonesia, Mar. 6, 2018.

Office Action dated Apr. 19, 2024 for CN App. No. 201980092435.4.

Office Action dated Nov. 8, 2023 for Chinese App. Ser. No. 201980053328.0 with English language translation.

\* cited by examiner

METHOD AND APPARATUS FOR CYCLE-BASED PROGRAMMING OF A CONTROL PROGRAM FOR A NUMERICALLY CONTROLLED MACHINE TOOL

The present disclosure relates to methods and apparatuses for cycle-based programming of a control program for a numerically controlled machine tool at a control apparatus of the machine tool.

BACKGROUND

In the field of numerically controlled machine tools, the machining of a workpiece at the machine tool, such as a milling machine tool, a lathe, a machining center, or the like, is typically controlled by a given control program, commonly referred to as an NC program.

The NC program may for example define one or more relative movements of the tool relative to the workpiece for one or more machining operations and/or for one or more feed motions. Such NC programs can be manually programmed, however, typically at least part of the programming of the NC programming is done in an automated fashion or semi-automated fashion, e.g. by support of a computer.

For example, it is known to automatically generate complex NC programs for machining complex workpiece geometries by support of a computerized CAD/CAM system, in which the tool path data is computed with support of the computerized CAD/CAM system on a desktop computer in the office environment, and the generated NC program is then loaded into the control device of the machine tool within the workshop environment.

While it is possible to generate complex NC programs for complex workpiece geometries, e.g. including free-form surfaces, such procedure has the drawback that the operator of the machine tool cannot easily understand or modify the NC program, and if the operator of the machine tool recognizes that the program needs to be modified within the workshop environment, the whole process needs to be repeated by going back into the office environment for re-computation of the NC program within the computerized CAD/CAM system.

For simpler workpiece geometries having simpler recognizable geometrical features, control devices of machine tools are typically equipped with a user-interface supported programming environment for cycle-based programming of the NC program, also sometimes referred to as shop floor programming or shop floor oriented programming.

For example the machine control system SINUMERIK by SIEMENS provides such corresponding CNC shop floor management software for cycle-based programming of the NC program by the operator of the machine tool at a user-interface provided by the machine control at a control panel of the machine tool.

In general, for the so-called Shopfloor Programming, two cases for providing 2D drawings are suitable. Most usual are 2D drawings as manual print outs, where the operator at the machine tool transfers geometry information by editing manually into the NC program using the controller specific cycle pool. The editing process starts with selection of a proper machining cycle and the operator fills the corresponding cycle mask with geometry and technology parameter values.

A second semi-automatic way for programming workpieces from 2D drawings is sometimes available by importing 2D data into the machine's control and support editing process by selecting recognized geometry information from the displayed 2D drawing.

This semi-automatic way is, for example, used for recognition of contour elements which would cause lots of effort to edit with the machine control's editor. For simple features like drilling holes only position information will be taken from a drawing.

In some cases, the operator may additionally need to manually input geometrical parameters to be used as input values to a machine control cycle associated with an appropriate machining cycle. For example, in case of a drill hole, a preset machine control cycle for drilling the drill hole may be provided and the machining cycle may further need to be manually propagated with parameters determined based on input geometrical parameters.

By such procedure the operator may semi-automatically create an NC program including one or more machining cycles so as to then execute the corresponding sequence of machining operations based on the created NC program under program control by the machine control device of the machine tool.

In such procedure the workpiece data needs to be input with one or more 2D drawings of views of the workpiece and such 2D drawings are typically generated by using a computerized CAD/CAM system for projecting a 3D model of the workpiece to different planes for creating the two dimensional views which are then used as input for the automated recognition of geometry features.

However, there are some drawbacks in the above cycle-based programming procedure. For example, automated scanning of 2D views may not allow to reliably extract all characteristics and dimensional parameters of an identified geometry feature of the workpiece. Hence, manual input of non-extractable parameters for certain machining cycles may be required or additional data or information within the workpiece data may need to be provided.

In view of the above drawbacks of the known cycle-based programming functions of machine tool control devices, it is an object of the present invention to provide improved cycle-based programming functions for machine tool control devices, preferably enabling more efficient and more reliable cycle-based programming functions, preferably at a higher user convenience.

SUMMARY

For solving the above-mentioned object, there is proposed a computer-implemented method for cycle-based programming of a control program for a numerically controlled machine tool at a control apparatus of the machine tool according to claim 1.

Furthermore, a corresponding control apparatus, a corresponding control system, a corresponding machine tool and a corresponding computer program product according to other independent claims are proposed. Dependent claims relate to preferred exemplary embodiments.

According to an aspect, there is proposed a computer-implemented method for cycle-based programming of a control program for a numerically controlled machine tool at a control apparatus of the machine tool.

The method may be comprising: providing a plurality of machine control cycles, wherein each machine control cycle is associated with a respective predetermined machining operation of processing a workpiece at the machine tool; providing workpiece data, in particular raw part data and/or machined part data, comprising 3D data indicative of at least part of a 3D model of a workpiece to be machined at the machine tool; associating geometrical features, which have been detected and/or identified within a data analysis processing performed on the basis of the provided workpiece data, each detected and/or identified geometrical feature being associated with a respective one of the predetermined machining operations, with a respective one of the machine control cycles which is associated with a respective one of the predetermined machining operations with which the respective associated geometry feature is producible; and/or providing, by a graphical user interface on a display of a control panel of the control apparatus of the machine tool, one or more user-selectable options for cycle-based programming of the control program for the machine tool, each user-selectable option enabling a user to select a respective one of the machine control cycles being respectively associated with a respective one of the detected and/or identified geometrical features.

According to preferred exemplary aspects, the method may be further comprising: determining, for at least one of the detected and/or identified geometrical features, a set of one or more parameters, in particular including at least one of one or more geometrical parameters and one or more position parameters, associated with the respective geometrical feature based on the 3D model of the provided workpiece data; and/or using the determined set of one or more parameters associated with the respective geometrical feature as input to the machine control cycle which is associated with the respective geometrical feature.

According to preferred exemplary aspects, the method may be further comprising: executing the data analysis processing, for detecting and/or identifying one or more geometrical features of the workpiece which are producible by at least one of the predetermined machining operations and/or for detecting and/or identifying one or more process parameters relevant for at least one of the predetermined machining operations, on the basis of the 3D model of the provided workpiece data at the control apparatus of the machine tool. According to preferred exemplary aspects, the workpiece data is provided at or input to the control apparatus of the machine tool.

According to preferred exemplary aspects, said associating geometrical features, which have been detected and/or identified within the data analysis processing performed on the basis of the provided workpiece data, with a respective one of the machine control cycles which is associated with a respective one of the predetermined machining operations with which the respective associated geometry feature is producible, is performed at the control apparatus of the machine tool.

According to preferred exemplary aspects, the method may be further comprising: executing the data analysis processing, for detecting and/or identifying one or more geometrical features of the workpiece which are producible by at least one of the predetermined machining operations and/or for detecting and/or identifying one or more process parameters relevant for at least one of the predetermined machining operations, on the basis of the 3D model of the provided workpiece data at a server being communicably connected to the control apparatus of the machine tool.

According to preferred exemplary aspects, the method may be further comprising: transmitting workpiece data input to the control apparatus of the machine tool from the control apparatus to the server via a network; or providing, by the graphical user interface on the display of the control panel of the control apparatus of the machine tool, one or more user-selectable options for enabling the user to select workpiece data being stored at the server.

According to preferred exemplary aspects, the method may be further comprising: transmitting feature data from the server to the control apparatus of the machine tool, wherein the transmitted feature data is preferably indicative of geometrical features, process parameters, and/or proper machining cycles detected and/or identified by the data analysis processing.

According to preferred exemplary aspects, said associating geometrical features, which have been detected and/or identified within the data analysis processing performed on the basis of the provided workpiece data, with a respective one of the machine control cycles which is associated with a respective one of the predetermined machining operations with which the respective associated geometry feature is producible, is performed at the server.

According to preferred exemplary aspects, the method may be further comprising: transmitting machine control cycle data from the server to the control apparatus of the machine tool, wherein the transmitted machine control cycle data is preferably indicative of process parameters and/or one or more machine control cycles being associated to geometrical features and/or process parameters detected and/or identified in the data analysis processing.

According to preferred exemplary aspects, the machine control cycle includes at least one of: one or more machine control cycles respectively associated with drilling operations, including in particular one or more of: a machine control cycle being associated with a drilling operation for drilling a borehole, in particular a cylindrical borehole, a machine control cycle being associated with a deep drilling operation for deep drilling, a machine control cycle being associated with a drilling operation for drilling a conical drill hole, a machine control cycle being associated with a thread drilling operation for drilling a threaded drill hole, and a machine control cycle being associated with a set of drilling operations for drilling a pitch circle or bolt-hole circle; one or more machine control cycles respectively associated with milling operations, including in particular one or more of: a machine control cycle being associated with a milling operation for pocket milling of a circular milled pocket, a machine control cycle being associated with a milling operation for pocket milling of a rectangular milled pocket, a machine control cycle being associated with a milling operation for face milling of a milled plane face, a machine control cycle being associated with a milling operation for contour milling of a milled contour, a machine control cycle being associated with a milling operation for groove milling of a milled groove, a machine control cycle being associated with a milling operation for oblong hole milling of a milled oblong hole, and a machine control cycle being associated with a gear cutting operation for gear cutting; and one or more machine control cycles respectively associated with turning operations including in particular one or more of: a machine control cycle being associated with a turning operation for thread cutting, a machine control cycle being associated with a turning operation for recess turning, a machine control cycle being associated with a turning operation for groove turning, and a machine control cycle being associated with a turning operation for area clearance turning.

Herein, it is to be understood that a machine control cycle is basically a control program for controlling at least part of a machining operation on a workpiece, wherein the steps of the machining operation may be pre-set or automatically generated on the basis of geometrical parameters obtained from the feature analysis of the workpiece geometry (e.g.

based on the 3D model data) and/or based on parameters obtained or calculated based on geometrical parameters obtained from the feature analysis of the workpiece geometry and/or pre-set criteria.

According to another aspect there may be proposed a control apparatus for controlling a numerically controlled machine tool, the control apparatus being adapted to execute a method according to any one of the above aspects or examples.

According to another aspect there may be proposed a system including a control apparatus for controlling a numerically controlled machine tool and a server being communicably connectable to the control apparatus via a network, the system being adapted to execute a method according to any one of the above aspects or examples.

According to another aspect there may be proposed machine tool including a control apparatus above.

According to another aspect there may be proposed a computer program product including machine-readable instructions, which when executed on a control apparatus of a numerically controlled machine tool, optionally in cooperation with a server being communicably connectable to the control apparatus via a network, cause execution of a method according to any one of the above aspects or examples.

DETAILED DESCRIPTION

Figure 1:
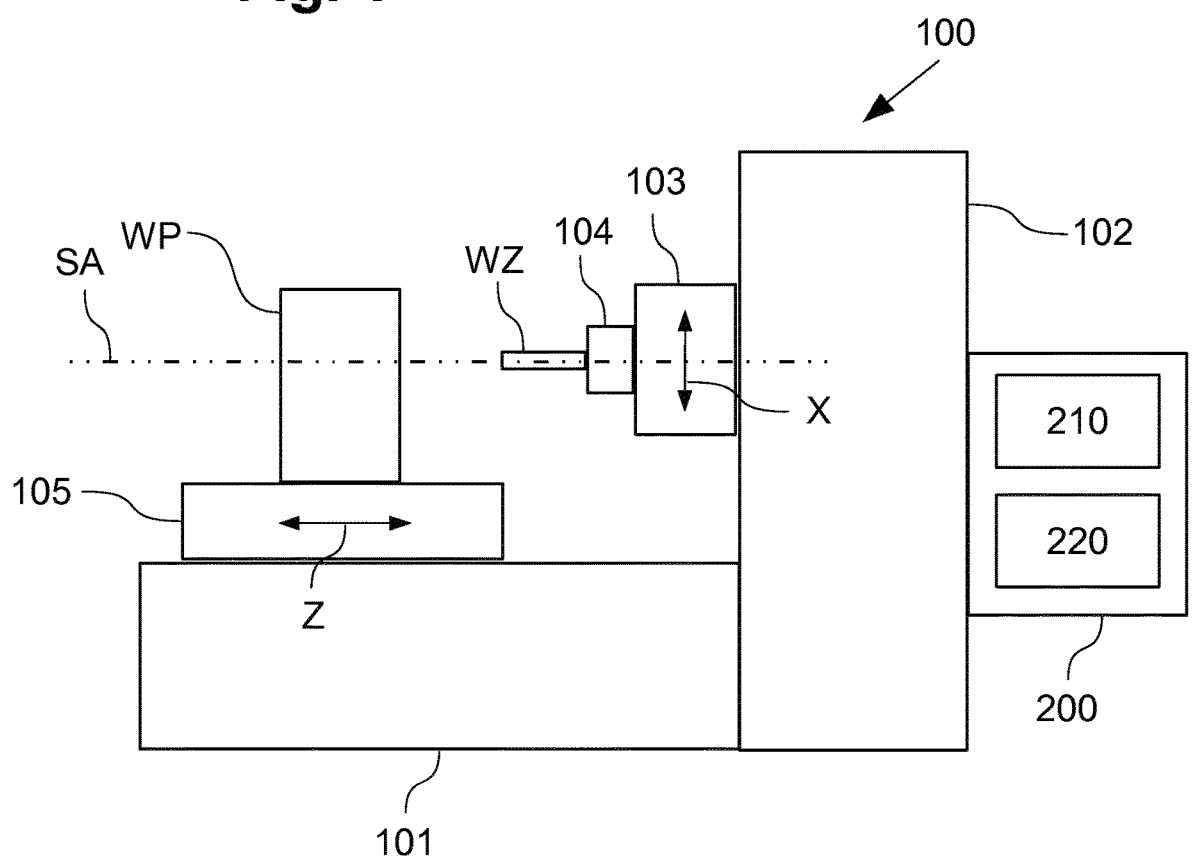
FIG. 1 exemplarily illustrates a schematic view of a numerically controlled machine tool.

In the following, preferred aspects and embodiments will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

FIG. 1 exemplarily illustrates a schematic view of a numerically controlled machine tool 100, exemplarily realized as a milling machine. However, the present invention is not limited to milling machines but may be also embedded for any numerical machine tools enabling machining operations such as grinding, boring, milling, turning, or the like, including but not being limited to milling machines, milling centers, universal milling machine tools, gear cutting machines or gear grinding machines, grinding machines, turning machines or lathes, milling-turning machine tools, machining centers, etc.

The machine tool 100 exemplarily includes a machine bed 101 and a machine upright 102. The machine bed 101 exemplarily supports a slide 105 which is movable in a horizontal Z-direction by a Z-axis of the machine tool 100. The slide 105 supports a workpiece WP which may be clamped on a workpiece table of the slide 105 (e.g. further including a rotary axis for rotating the workpiece).

The machine upright 102 exemplarily supports a spindle head slide 103 which carries a tool-carrying spindle 104 driving a tool WZ about the spindle axis SA. Exemplarily the spindle head slide 103 is movable in a vertical X-direction by an X-axis of the machine tool 100. The spindle head slide 103 may be further movable in a horizontal Y-direction by a Y-axis of the machine tool 100 (e.g. perpendicular with respect to the drawing plane). The spindle head slide 103 may be including a rotary axis or pivot axis for rotating or pivoting the spindle head.

The machine tool 100 further includes a machine control (control apparatus) having a control panel 200 (also referred to as operator panel) being equipped with a display screen 210 and a user input section 220 for receiving user input, e.g. via buttons, sliders, knobs, keys, keypads, mouse, trackball, switches or other, including also optionally one or more touch display portions (which may be combined with display screen 210).

The user (operator) may operate and control functions of the machine tool via user inputs to the input section 220 and the user may also monitor a status of the machine tool or operations of the machine tool via the display screen 210.

In addition, the control panel 200 may be configured to enable the user to perform cycle-based programming of a control program for the machine tool at a graphical user interface displayed at the display screen 210. Exemplary embodiments and aspects of such cycle-based programming will be explained with reference to FIGS. 2 to 5.

Figure 2:
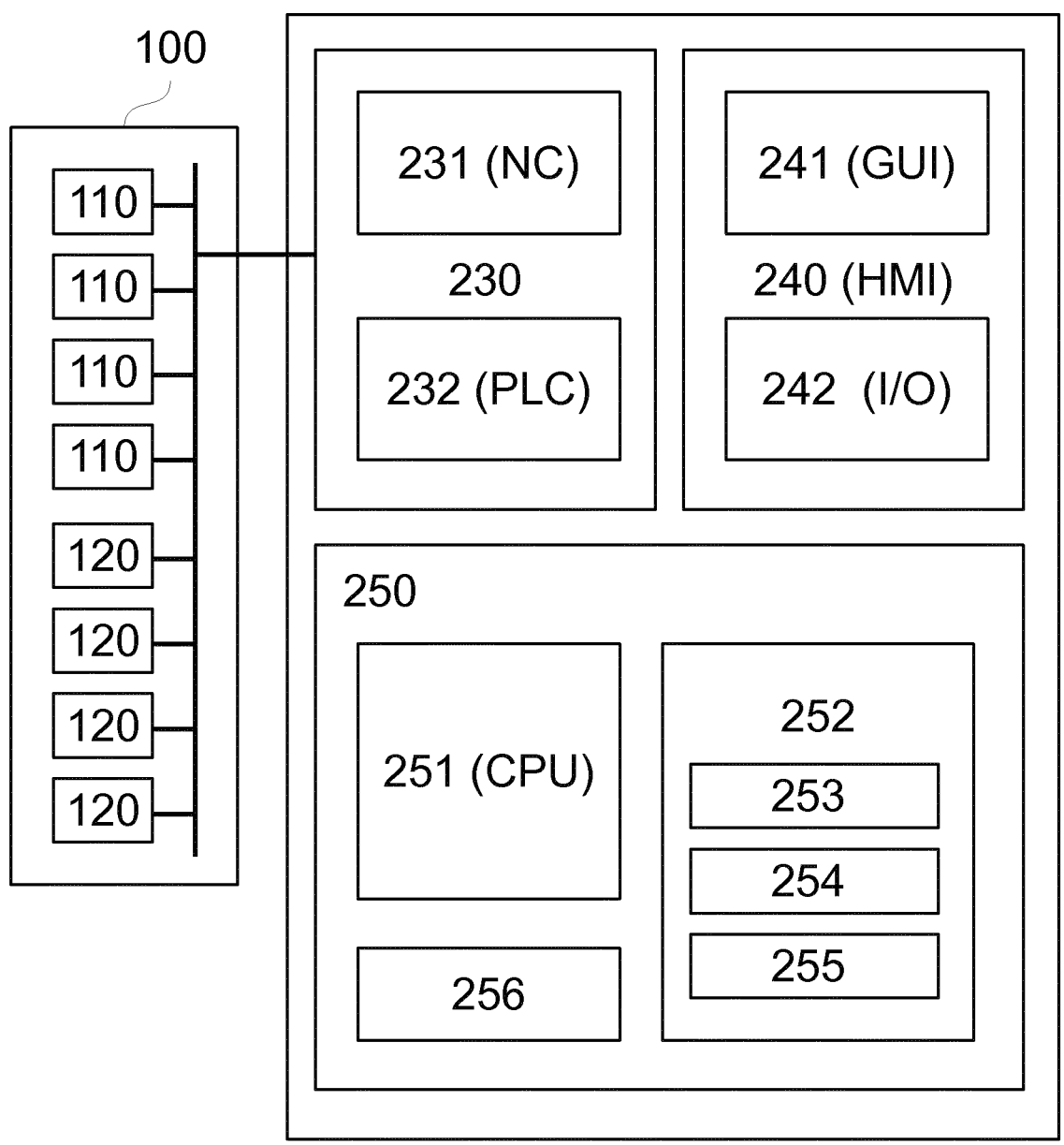
FIG. 2 exemplarily illustrates a schematic view of a system for machining-cycle based programming according to an exemplary embodiment.

FIG. 2 exemplarily illustrates a schematic view of a system for machining-cycle based programming according to an exemplary embodiment.

The system includes a control apparatus 200 of a machine tool 100 (such as e.g. machine tool 100 of FIG. 1). Exemplarily the machine tool 100 is only schematically illustrated by a plurality of actuators 110 such as axis drives or the like and a plurality of sensors 120 such as temperature sensors, position sensors, pressure sensors, etc.

The control apparatus 200 exemplarily includes the machine control 230 typically including an NC (numerical control) controller 231 and a PLC (programmable logic control) controller 232. Furthermore the control apparatus 200 exemplarily includes an HMI (human machine interface) 240 including a GUI (graphical user interface) 241 and an I/O (input/output) section 242 (which may include the input section 220 and the display screen 210 above).

The control apparatus 200 exemplarily includes a computer 250 which includes a CPU (central processing section) 251 and a data storage 252 (e.g. including memories, cache, disks and/or flash drives, or the like). The computer 250 may further include an interface 256, e.g. for sending/receiving data via a network by wired or wireless connection, or for reading data e.g. by use of a disc drive, a Bluetooth connection, a WiFi connection, via USB or Ethernet ports or others.

Exemplarily the data storage 252 stores the application data 253 of the graphical user interface and related functions and processing capabilities, e.g. including applications or programs executing the herein disclosed methods or operations thereof. Furthermore, the data storage 252 exemplarily stores machining cycle data 254 indicative of a plurality of machining cycles and/or associated programs(e.g. NC code templates or NC code generation algorithms), and workpiece data 255 indicative of one or more 3D models of associated workpieces (e.g. including raw part data and more importantly finished part data of the workpiece(s)). The 3D models may be stored as commonly known CAD formats, including STEP data or proprietary CAD formats.

In the exemplary embodiment of FIG. 2, all functions and processing steps mentioned in the below method of FIG. 4 may be performed at the control apparatus 200. However, in other exemplary embodiments it is further possible that the method is performed in a client-server architecture in which a client application is running on computer 250 and some functions or processing steps are performed on a server communicably connected via a network, such as e.g. exemplarily shown in FIG. 3 including the additional server 300.

Figure 3:
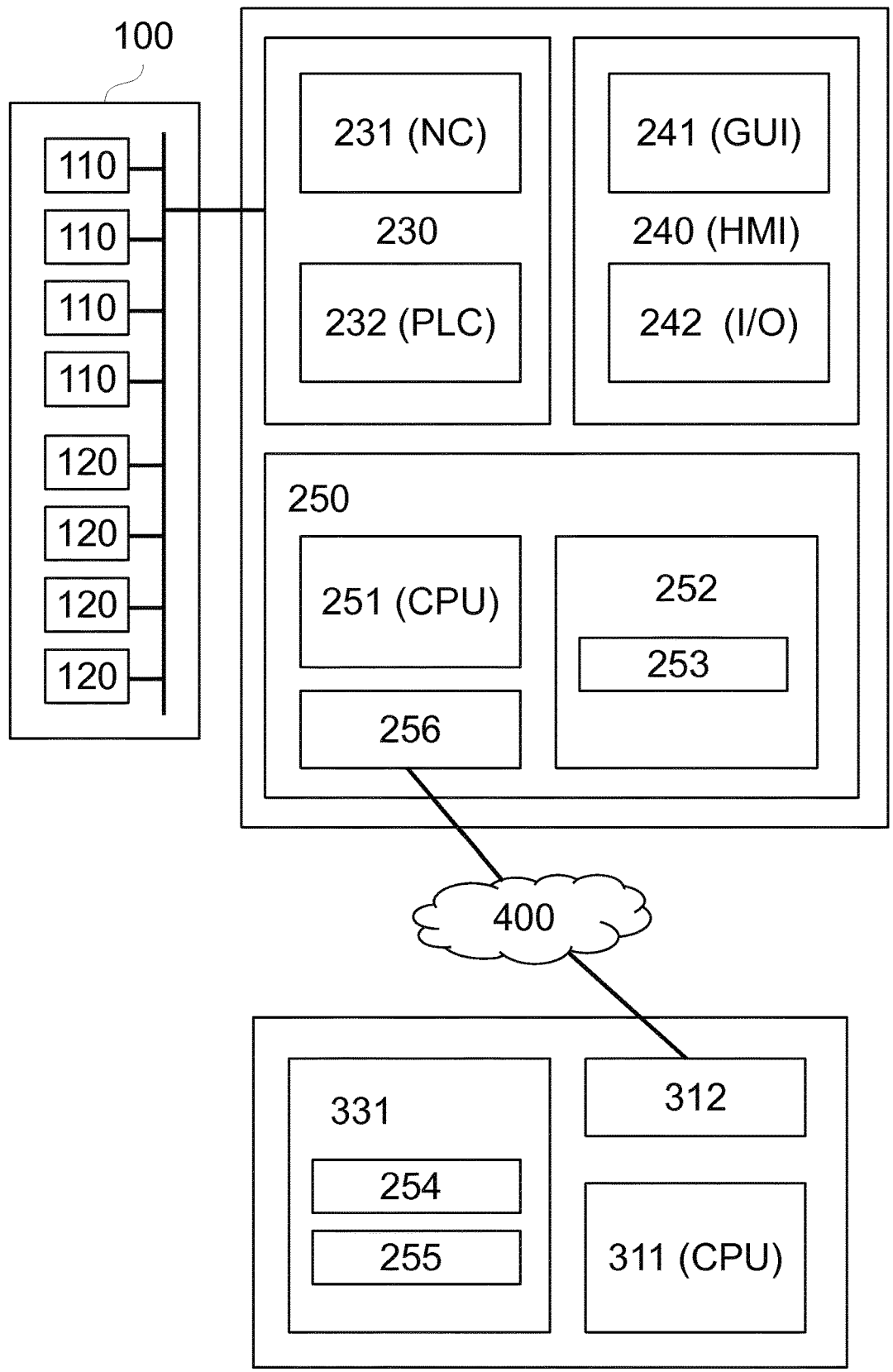
FIG. 3 exemplarily illustrates a schematic view of a system for machining-cycle based programming according to another exemplary embodiment.

FIG. 3 exemplarily illustrates a schematic view of a system for machining-cycle based programming according to another exemplary embodiment. The control apparatus 200 is similar to the control apparatus 200 of FIG. 2, however the application data 253 further includes a client application in communication with a server application running on server 300 communicably connected via the network 400.

Exemplarily, the server 300 includes a CPU 311 and an interface (e.g. network interface) 312 for connection to the network 400. The interface 256 of the control apparatus 200 is exemplarily also configured to connect to the network 400 for server-client communications. Exemplarily the data storage 331 of the server 300 stores machining cycle data 254 and workpiece data 255.

Figure 4:
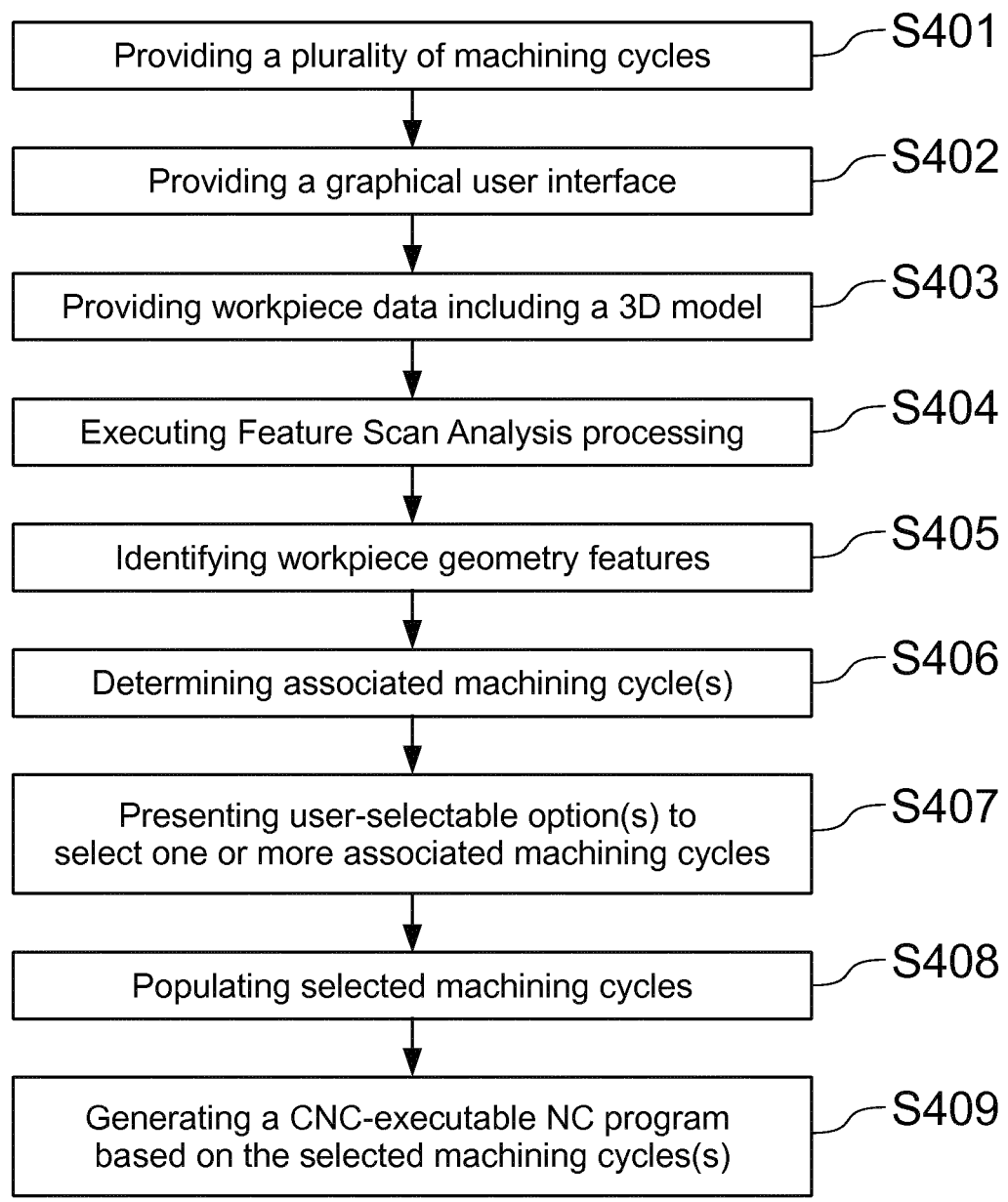
FIG. 4 exemplarily illustrates a flow chart of a method for machining-cycle based programming according to an exemplary embodiment.
Figure 5:
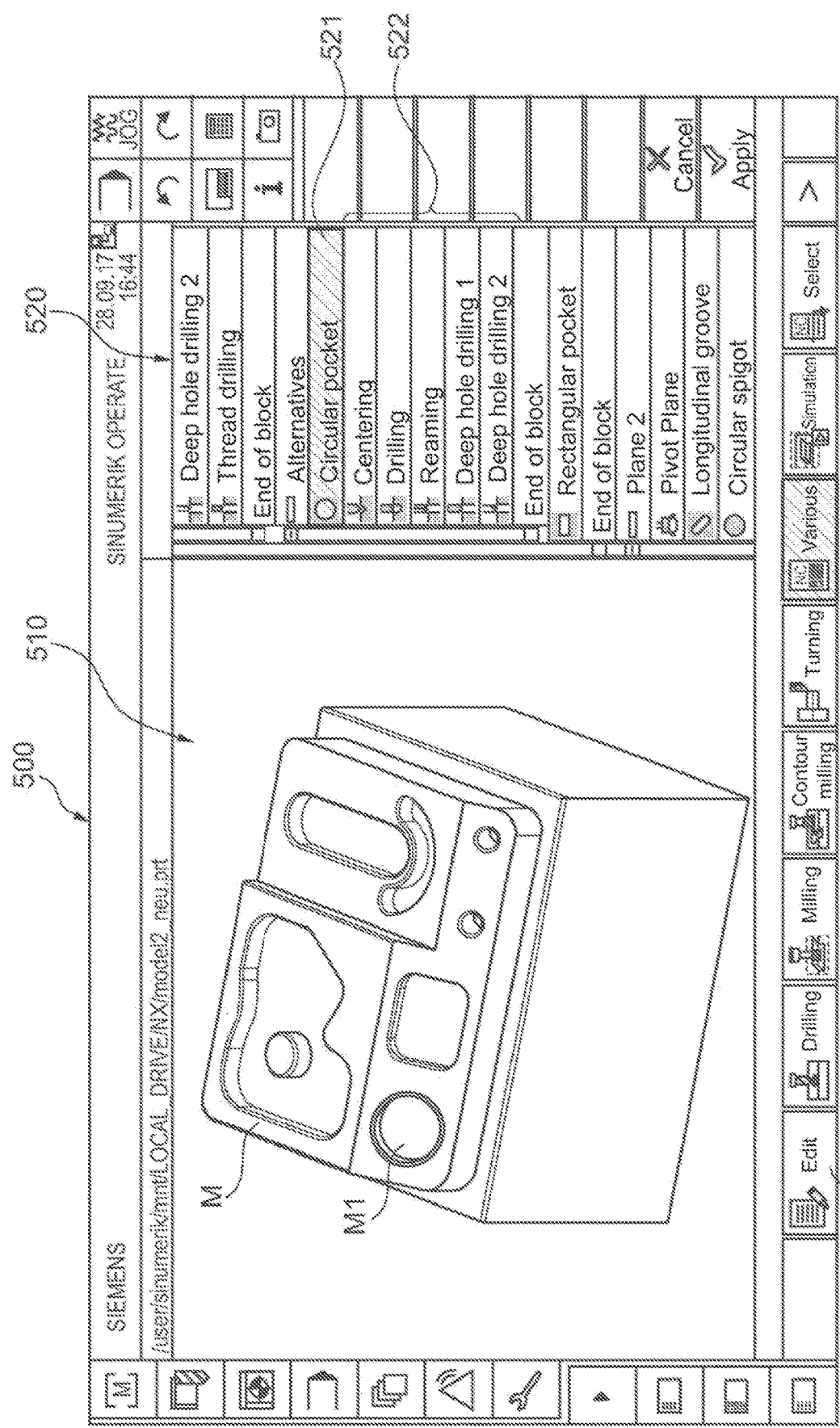
FIG. 5 exemplarily illustrates a graphical user interface display for machining-cycle based programming according to an exemplary embodiment.

FIG. 4 exemplarily illustrates a flow chart of a method for machining-cycle based programming according to an exemplary embodiment.

The method includes providing a plurality of machining cycles in step S401, e.g. by providing and/or storing machining cycle data 254 indicative of plural machining cycles. The machining cycle data 254 may be stored on the side of the control apparatus 200 and/or on the server 300 side, as explained above.

Each machining cycle is exemplarily associated with a certain type of machining operation which is available to be controlled on the machine tool, such as milling operations, turning operations, grinding operations, boring operations and/or measurement operations (such as workpiece scanning).

Specifically, the machining cycle data 254 may include machine control cycles (such as e.g. NC code portions) associated with the certain machining operations.

In some exemplary embodiments, the machine control cycles may include at least one of:
  (i) one or more machine control cycles respectively associated with drilling operations, including in particular one or more of:
    a machine control cycle being associated with a drilling operation for drilling a borehole, in particular a cylindrical borehole,
    a machine control cycle being associated with a deep drilling operation for deep drilling,
    a machine control cycle being associated with a drilling operation for drilling a conical drill hole,
    a machine control cycle being associated with a thread drilling operation for drilling a threaded drill hole, and
    a machine control cycle being associated with a set of drilling operations for drilling a pitch circle or bolt-hole circle;
  (ii) one or more machine control cycles respectively associated with milling operations, including in particular one or more of:
    a machine control cycle being associated with a milling operation for pocket milling of a circular milled pocket,
    a machine control cycle being associated with a milling operation for pocket milling of a rectangular milled pocket,
    a machine control cycle being associated with a milling operation for face milling of a milled plane face,
    a machine control cycle being associated with a milling operation for contour milling of a milled contour,
    a machine control cycle being associated with a milling operation for groove milling of a milled groove,
    a machine control cycle being associated with a milling operation for oblong hole milling of a milled oblong hole, and
    a machine control cycle being associated with a gear cutting operation for gear cutting; and
  (iii) one or more machine control cycles respectively associated with turning operations including in particular one or more of:
    a machine control cycle being associated with a turning operation for tread turning,
    a machine control cycle being associated with a turning operation for recess turning,
    a machine control cycle being associated with a turning operation for groove turning, and
    a machine control cycle being associated with a turning operation for area clearance turning.

The method further includes a Step S402 of providing a graphical user interface, such as GUI 241, e.g. on a display 210. A corresponding example of a display screen of such GUI is explained with reference to FIG. 5 below.

The method further includes a step S403 of providing workpiece data including a 3D model of at least one workpiece (e.g. including raw part data and more importantly finished part data). The 3D model(s) may be stored as commonly known CAD formats, including STEP data or proprietary CAD formats. The workpiece data 255 may be stored on the side of the control apparatus 200 and/or on the server 300 side, as explained above.

The graphical user interface may enable the user to load a 3D model. This may be loaded from the workpiece data 255 stored on the side of the control apparatus 200 and/or on the server 300 side. The user may be provided with the user-selectable option to load a 3D model stored on the side of the control apparatus 200 and/or on the server 300 side. Also, the user may input the workpiece data including the 3D model to the interface 256 e.g. via a Bluetooth connection, WiFi connection, Ethernet connection or from a USB memory stick via a USB port, or the like.

When the workpiece data is stored on the server 300 side, it is possible that the 3D model data is transmitted from the server 300 to the control apparatus 200 via the network 400 for processing and/or viewing functions displaying the 3D model or parts thereof on the GUI display.

The method further includes a step S404 of executing a Feature Scan processing of scanning geometrical characteristics of the 3D model. The step S404 can be performed on the control apparatus 200 or the server 300 side.

Specifically, the Feature Scan scans geometrical characteristics of the 3D model for identifying workpiece geometry features that can be produced by at least one of the machining cycles or associated machining cycle operations.

The method further includes a step S405 of identifying workpiece features that can be produced by at least one of the machining cycles or associated machining cycle operations based on the Feature Scan analysis processing.

The method further includes a step S406 of determining associated machining cycles which are associated with identified geometry features. Specifically, a machining cycle is determined to be associated with an identified geometry feature of the workpiece if the geometry feature is producible with the machining operation associated with the respective machining cycle.

The method further includes a step S407 of presenting user-selectable options at the graphical user interface enabling a user to select one or more associated machining cycles. Specifically, the user may select identified geometry features, and for each identified geometry feature the user may be enabled to select one or more associated machining cycles.

The method further includes a step S408 of populating selected machining cycles based on the 3D model data of the workpiece data. For example, geometrical parameters regarding size, position, shape, geometry or other characteristics of the identified geometry feature can be extracted from the 3D model data and is then used, preferably in automated fashion, e.g. to populate an NC code template associated with the respective machining cycle based on the extracted geometrical parameters and/or to generate an NC program according to an generation algorithm using extracted geometrical parameters. This reduces the input required to be input manually by the user.

The method further includes a step of generating a CNC-executable NC program based on the selected (and optionally automatically populated) machining cycles. This may optionally further include manually adapting or editing the NC program by the user with graphical support of changing zero offsets and processing planes FIG. 5 exemplarily illustrates a graphical user interface display for machining-cycle based programming according to an exemplary embodiment.

The display exemplarily includes a display view 500 having a 3D model display window portion 510 on which a 3D model M of a workpiece is exemplarily illustrated. The top surface of the 3D model M includes various geometry features such as the circular recess M1.

The display view 500 further exemplarily includes a selection window presenting user-selectable options, exemplarily as a list or menu, each user-selectable option being exemplarily associated with a certain machining cycle.

At present the selectable option 521 is highlighted and the circular recess M1 as an exemplary geometry feature is highlighted as well. Specifically, if the user selects a geometry feature, the respective associated machining cycle options are highlighted, and if a machining cycle option is selected, the associated geometry feature is highlighted.

Exemplarily, the circular recess M1 is associated with plural machining cycles as alternatives, such as the selectable options 522 representing different machining operations available for producing the circular recess M1, e.g. by boring (selection "Bohrung").

If the user wishes to edit an NC program or program part according to the selected machining cycle, there is presented the user selectable option "Edit" by which the user is enabled to open an editor for editing the NC program code or also to actuate automatic populating of parameters extracted from the 3D model into the NC code section of the selected machining cycle.

In further exemplary embodiments, in addition or alternatively to determining and/or identifying geometrical features from the workpiece data, such as the 3D model data, it is also advantageously possible to determine/identify and/or even extract process parameters relevant for suitable machining operations from the workpiece data, such as the 3D model data. Such process parameters can be used to generate and/or populate suitable control data for the one or more detected machining cycles (machining operations).

Examples of such possible process parameters relevant for suitable machining operations may include specifications or information on one or more of: model formats and/or sketch formats, model type and/or sketch type (e.g. including processing tools, processing status, content, purpose), line types, surface types, creator name, controller name, date of generation and/or control, admissible tolerances, admissible surface roughness, measure scale, material, raw part number, model number, weight or mass, name, sketch number, measure information (e.g. including dimensioning parameters, such as length(s), width(s), height(s), distance(s), angle(s), radius/radii and/or diameter(s)), thread specification(s), thread type(s), technical surfaces, surface characteristics, surface roughness characteristics, surface symbols, symbols for directions of grooves, mean roughness index/indices, surface structure(s), additional specifications, workpiece edges (e.g. with indeterminate shape), hardness specification(s) (e.g. for hardening, roughing, tempering, quenching and/or heat-treatment), process characteristics (such as process step order, process description, process data, information on preferred process type), measurement specification(s) (e.g. point(s) of measurement, base size specification(s), and/or check size specification(s)), tolerance(s), fitting and/or clearance specification(s), general tolerances, limits of size, tolerances on shape and/or positions (e.g. straightness, evenness, roundness, and/or parallelism), norm(s) information, materials, connection elements and/or disconnection points, graphical symbols, etc.

In the above, the process may determine, extract and/or identify further information (process parameters and/or process information) from the workpiece data relevant to the machining operation and the information may, in addition or alternatively to determined geometry features, be used to populate and/or generate control data for one or more machining operations and/or machining cycles, leading to further improved cycle-based programming.

Overall, according to exemplary embodiments above, the user may be provided with a preview of a 3D model that can be zoomed and/or rotated so as to observe the characteristics of identified geometry features. Also, the user is enabled to select machining cycles for identified geometry features. Since the geometry features are advantageously identified from a 3D model, geometry feature identification can be executed more reliably due to the 3D information, and furthermore the 3D model allows to advantageously extract more geometrical parameters automatically more reliably so as to populate the NC code in an automated fashion. This process is more efficient, reliable and also less affected by human error.

Summarizing, the present invention enabled to provide improved cycle-based programming functions for machine tool control devices, enabling more efficient and more reliable cycle-based programming functions, preferably at a higher user convenience.

By exemplary embodiments as described above, there are proposed beneficial aspects and features to enhance the programming options of cycle-based programming functions within a shop floor programming environment.

As will be appreciated by one of skill in the art, the present invention, as described hereinabove and the accompanying figures, may be embodied as a method (e.g., a computer-implemented process, or any other process), control apparatus (including a device, machine, system, computer program product, and/or any other apparatus), or a combination of the foregoing.

Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system". Furthermore, embodiments of the present invention may take the form of a computer program product on a computer-readable medium having computer-executable program code embodied in the medium.

Embodiments of the present invention are described hereinabove with reference to flowchart illustrations and/or block diagrams of methods and apparatuses. It will be understood that each block of the flowchart illustrations and/or block diagrams, and/or combinations of blocks in the flowchart illustrations and/or block diagrams can be implemented by computer-executable program code.

The computer-executable program code may be provided to a processor of a general purpose computer, special purpose computer, or other programmable data processing apparatus, such as e.g. a controller, to produce a particular machine, such that the program code, which executes via the processor of the computer or other programmable data processing apparatus, create means for implementing the functions/acts/outputs specified in the flowchart, block diagram block or blocks, figures, and/or written description. These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description. The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible. Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously. Those skilled in the art will also appreciate, in view of this disclosure, that different embodiments of the invention described herein may be combined to form other embodiments of the invention.

The invention claimed is:

1. A computer-implemented method for cycle-based programming of a control program for a numerically controlled machine tool at a control apparatus of and at the machine tool, the control apparatus of and at the machine tool including a control panel with a display and a graphical user interface displayed on the display, the computer-implemented method comprising:

providing a plurality of machine control cycles, wherein each machine control cycle is associated with a respective predetermined machining operation of processing a workpiece at the machine tool;

providing workpiece data, in particular raw part data and/or machined part data, comprising 3D data indicative of at least part of a 3D model of a workpiece to be machined at the machine tool;

executing a data analysis processing, for detecting and/or identifying one or more geometrical features of the workpiece which are producible by at least one of the predetermined machining operations and/or for detecting and/or identifying one or more process parameters relevant for at least one of the predetermined machining operations, on the basis of geometrical characteristics of the 3D model of the provided workpiece data at a server being communicably connected to the control apparatus of and at the machine tool or at the control apparatus of and at the machine tool;

associating geometrical features, which have been detected and/or identified within the data analysis processing performed on the basis of the geometrical characteristics of the 3D model of the provided workpiece data, each detected and/or identified geometrical feature being associated with a respective one of the predetermined machining operations, with a respective one of the machine control cycles which is associated with a respective one of the predetermined machining operations with which the respective associated geometry feature is producible;

providing, with the graphical user interface displayed on the display of the control panel of the control apparatus of and at the machine tool, one or more user-selectable options for cycle-based programming of the control program for the machine tool, each user-selectable option enabling a user to select a respective one of the machine control cycles being respectively associated with a respective one of the detected and/or identified geometrical features;

determining, for at least one of the detected and/or identified geometrical features a set of one or more parameters, in particular including at least one of one or more geometrical parameters and one or more position parameters, associated with the respective geometrical feature based on the 3D model of the provided workpiece data; and using the determined set of one or more parameters associated with the respective geometrical feature to automatically populate an NC code template associated with a machine control cycle which is associated with the respective geometrical feature.

2. The computer-implemented method according to claim 1, wherein
the workpiece data is provided at or input to the control apparatus of the machine tool.

3. The computer-implemented method according to claim 1, wherein
said associating geometrical features, which have been detected and/or identified within the data analysis processing performed on the basis of the provided workpiece data, with a respective one of the machine control cycles which is associated with a respective one of the predetermined machining operations with which the respective associated geometry feature is producible, is performed at the control apparatus of the machine tool.

4. The computer-implemented method according to claim 1, further comprising:
transmitting workpiece data input to the control apparatus of the machine tool from the control apparatus to the server via a network; or
providing, by the graphical user interface on the display of the control panel of the control apparatus of the machine tool, one or more user-selectable options for enabling the user to select workpiece data being stored at the server.

5. The computer-implemented method according to claim 1, further comprising:
transmitting feature data from the server to the control apparatus of the machine tool,
wherein the transmitted feature data is indicative of geometrical features and/or process parameters detected and/or identified by the data analysis processing.

6. The computer-implemented method according to claim 1, wherein
said associating geometrical features, which have been detected and/or identified within the data analysis processing performed on the basis of the provided workpiece data, with a respective one of the machine control cycles which is associated with a respective one of the predetermined machining operations with which the respective associated geometry feature is producible, is performed at the server.

7. The computer-implemented method according to claim 1, further comprising:
transmitting machine control cycle data from the server to the control apparatus of the machine tool,
wherein the transmitted machine control cycle data is indicative of process parameters and/or one or more machine control cycles being associated to geometrical features and/or process parameters detected and/or identified in the data analysis processing.

8. The computer-implemented method according to claim 1, wherein
the machine control cycle includes at least one of:
one or more machine control cycles respectively associated with drilling operations, including in particular one or more of: a machine control cycle being associated with a drilling operation for drilling a borehole, in particular a cylindrical borehole, a machine control cycle being associated with a deep drilling operation for deep drilling, a machine control cycle being associated with a drilling operation for drilling a conical drill hole, a machine control cycle being associated with a thread drilling operation for drilling a threaded drill hole, and a machine control cycle being associated with a set of drilling operations for drilling a pitch circle or bolt-hole circle;
one or more machine control cycles respectively associated with milling operations, including in particular one or more of: a machine control cycle being associated with a milling operation for pocket milling of a circular milled pocket, a machine control cycle being associated with a milling operation for pocket milling of a rectangular milled pocket, a machine control cycle being associated with a milling operation for face milling of a milled plane face, a machine control cycle being associated with a milling operation for contour milling of a milled contour, a machine control cycle being associated with a milling operation for groove milling of a milled groove, a machine control cycle being associated with a milling operation for oblong hole milling of a milled oblong hole, and a machine control cycle being associated with a gear cutting operation for gear cutting; and
one or more machine control cycles respectively associated with turning operations including in particular one or more of: a machine control cycle being associated with a turning operation for tread turning, a machine control cycle being associated with a turning operation for recess turning, a machine control cycle being associated with a turning operation for groove turning, and a machine control cycle being associated with a turning operation for area clearance turning.

9. A control apparatus for controlling a numerically controlled machine tool, the control apparatus being adapted to execute a method according to claim 1.

10. A machine tool including a control apparatus according to claim 9.

11. A system including a control apparatus for controlling a numerically controlled machine tool and a server being communicably connectable to the control apparatus via a network, the system being adapted to execute a method according to claim 1.

12. A non-transitory machine-readable storage medium storing a computer program product including machine-readable instructions, which when executed on a control apparatus of a numerically controlled machine tool, optionally in cooperation with a server being communicably connectable to the control apparatus via a network, cause execution of a method according to claim 1.

* * * * *